United States Patent
Kumru

(10) Patent No.: US 10,253,168 B2
(45) Date of Patent: Apr. 9, 2019

(54) ADDITIVE COMPOSITION FOR AMINE HARDENERS, USE OF SAID ADDITIVE COMPOSITION, AND AMINE HARDENER COMPOSITION CONTAINING SAID ADDITIVE COMPOSITION

(71) Applicant: Hilti Aktiengesellschaft, Schaan (LI)

(72) Inventor: Memet-Emin Kumru, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 483 days.

(21) Appl. No.: 14/780,285

(22) PCT Filed: Mar. 25, 2014

(86) PCT No.: PCT/EP2014/055935
§ 371 (c)(1),
(2) Date: Sep. 25, 2015

(87) PCT Pub. No.: WO2014/154675
PCT Pub. Date: Oct. 2, 2014

(65) Prior Publication Data
US 2016/0075861 A1    Mar. 17, 2016

(30) Foreign Application Priority Data
Mar. 26, 2013 (DE) .......... 10 2013 205 347

(51) Int. Cl.
| | |
|---|---|
| C04B 103/44 | (2006.01) |
| C08K 9/06 | (2006.01) |
| C04B 14/04 | (2006.01) |
| C04B 14/06 | (2006.01) |
| C04B 14/10 | (2006.01) |
| C04B 14/22 | (2006.01) |
| C04B 14/30 | (2006.01) |
| C04B 14/34 | (2006.01) |
| C04B 14/38 | (2006.01) |
| C04B 16/04 | (2006.01) |
| C04B 20/10 | (2006.01) |
| C04B 22/06 | (2006.01) |
| C04B 24/12 | (2006.01) |
| C04B 24/38 | (2006.01) |
| C04B 26/04 | (2006.01) |
| C04B 26/14 | (2006.01) |
| C04B 26/16 | (2006.01) |
| C04B 28/02 | (2006.01) |
| C04B 28/14 | (2006.01) |
| C04B 40/00 | (2006.01) |
| C04B 40/06 | (2006.01) |

(52) U.S. Cl.
CPC ............ *C08K 9/06* (2013.01); *C04B 20/1051* (2013.01); *C04B 26/04* (2013.01); *C04B 26/16* (2013.01); *C04B 28/02* (2013.01); *C04B 28/14* (2013.01); *C04B 40/0039* (2013.01)

(58) Field of Classification Search
CPC ........................................................ C08K 5/17
See application file for complete search history.

(56) References Cited

U.S. PATENT DOCUMENTS

| | | |
|---|---|---|
| 4,837,260 A | 6/1989 | Sato et al. |
| 6,271,288 B1 | 8/2001 | Yamaguchi et al. |
| 2002/0091214 A1 | 7/2002 | Waanders et al. |
| 2009/0324729 A1 | 12/2009 | Koziara et al. |
| 2010/0029818 A1 | 2/2010 | Schachtely et al. |
| 2010/0196243 A1 | 8/2010 | Meyer et al. |
| 2011/0201726 A1 | 8/2011 | Pfeil |
| 2012/0270967 A1 | 10/2012 | Burckhardt et al. |
| 2014/0106176 A1 | 4/2014 | Albert et al. |

FOREIGN PATENT DOCUMENTS

| | | |
|---|---|---|
| DE | 37 17 545 A1 | 11/1987 |
| DE | 10 2011 084 183 A1 | 9/2012 |
| EP | 0 690 112 A1 | 1/1996 |
| EP | 1 674 495 A1 | 6/2006 |
| EP | 2 336 213 A1 | 6/2011 |
| EP | 2 357 162 A1 | 8/2011 |
| EP | 2 371 914 A1 | 10/2011 |
| JP | 02123124 A * | 5/1990 |
| JP | 2000-86832 A | 3/2000 |
| JP | 2008-544050 A | 12/2008 |
| JP | 2010-534619 A | 11/2010 |
| JP | 2011-522790 A | 8/2011 |
| JP | 2013-506710 A | 2/2013 |
| RU | 2 374 282 C2 | 11/2009 |
| UA | 17 349 U | 9/2006 |
| WO | WO 2011/043880 A1 | 4/2011 |

OTHER PUBLICATIONS

English abstract of JP02123124A (1990).*

(Continued)

*Primary Examiner* — Peter F Godenschwager
(74) *Attorney, Agent, or Firm* — Grüneberg and Myers PLLC

(57) ABSTRACT

The invention relates to an additive composition, which comprises a thickener and a thixotropic agent and is characterized in that the thickener is cellulose or a derivative thereof and that the thixotropic agent is a pyrogenically produced silicic acid, the surface of which is modified with groups of general formula (I) $-SiR_aR^1_bOR^2_c$ (I), in which a can equal 1, 2, or 3, b can equal 0, 1, or 2, and c can equal 0, 1, or 2, wherein a+b+c=3, and R can be a monovalent, optionally monounsaturated or polyunsaturated, optionally branched hydrocarbon group having 1 to 24 carbon atoms, $R^1$ can be a likewise monovalent, optionally monounsaturated or polyunsaturated, optionally branched hydrocarbon group having 1 to 20 carbon atoms, and $R^2$ can be a hydrogen atom, a monovalent, optionally monounsaturated or polyunsaturated, optionally branched hydrocarbon group having 1 to 20 carbon atoms, or a bond to another Si atom, with the stipulation that at least one of the groups R or $R^1$ is a hydrocarbon group having more than 3 carbon atoms.

8 Claims, No Drawings

(56) References Cited

OTHER PUBLICATIONS

Russian-language Decision of Grant issued in counterpart Russian Application No. 2015145607/03(070191) dated Dec. 20, 2016 (Nine (9) pages).
Canadian Office Action issued in counterpart Canadian Application No. 2,908,001 dated Jun. 1, 2016 (five (5) pages).
Degussa, "Aerosil R202—Datasheet," Mar. 31, 2004, XP055121639 (two (2) pages).
International Search Report (PCT/ISA/210) issued in PCT Application No. PCT/EP2014/055935 dated Jun. 16, 2014 with English-language translation (four (4) pages).
German-language Office Action issued in counterpart German Application No. DE 10 2013 205 347.9 dated Nov. 25, 2013 (three (3) pages).
Japanese-language Office Action issued in counterpart Japanese Application No. 2016-504630 dated Oct. 28, 2016 with English translation (Seven (7) pages).

\* cited by examiner

ADDITIVE COMPOSITION FOR AMINE HARDENERS, USE OF SAID ADDITIVE COMPOSITION, AND AMINE HARDENER COMPOSITION CONTAINING SAID ADDITIVE COMPOSITION

The present invention relates to an additive composition for hybrid and/or amine hardeners and use of said composition as an additive for hybrid and/or amine hardeners.

Reactive resin compositions, in particular one- or two-component reactive resin compositions based on amine-hardenable compounds are known for various applications, in particular in the field of building materials. One much-used application is mortar and plugging compounds, which are usually offered as two-component injection or cartridge systems. In this case, two systems have been established, one on the basis of a radically hardenable compounds and one based on compounds which can react with an amine. The latter reaction resin compositions contain, as an organic binder, compounds which can harden with an amine, of which epoxy compounds are widely used. In addition to the organic binder, the reaction resin compositions often contain hydraulically setting compounds as additional inorganic binders, such as cement and gypsum. This allows the properties of the reaction resin compositions to be controlled and adapted to different uses. Furthermore, the reaction resin compositions generally contain inorganic fillers such as quartz and the like. Other important ingredients are additives that are added in small amounts to improve the storage stability and/or the processing properties, such as fumed silicas. Thus, particularly for solid components, the settling behavior can be controlled and the viscosity and flow properties of the components adjusted to the required level.

It is known that the flow and sedimentation of adhesives and sealant systems, for example those based on epoxy, polyurethane or vinyl ester resins, compared to hydrophilic, fumed silicas, can be effectively adjusted with hydrophobic fumed silicas. Which silica is used is generally determined by the polarity of the component whose properties are to be adjusted with silicas.

In particular, special requirements exist for the components of the two-component mortar mixtures, which, with a suitable dispenser, are mixed on site into the ready-mortar using a static mixer and used for chemical fixation of fasteners into holes. Firstly, the shelf life must be ensured over a certain period without settling of the solids contained in the component over time, to avoid mixing interference during dispensing. Furthermore it is important that the extrusion forces be as low as possible, despite of the high viscosity of the mixtures, so as not to cause user fatigue with frequent use of the mortar mixtures. After injecting the mortar mixture into the hole, the mass must immediately become so viscous or firm that the mortar mass does not run out again from the hole. This is very important, particularly in overhead applications, in order to ensure that the hole is filled with a sufficient quantity of the mortar mixture and high load values can be achieved.

The disadvantage here is that to achieve the required properties, often large amounts of thickeners and thixotropic agents such as highly dispersed silica must be used to adjust the desired flow and sedimentation behavior of the components. Large amounts of thickener and thixotropic agent are required, depending on the viscosity of the unfilled reaction resin and hardener component, in particular at low viscosity of the components.

From EP 2357162 A1, a reaction resin composition for civil engineering purposes on the basis of a hybrid binder is known, i.e., encompassing the resin component with amine-hardenable compounds and radically hardenable compounds. As hardeners, 2-methyl-1,5-pentanediamine is used for the amine-hardenable compound and benzoyl peroxide is used for the free-radically hardenable compound. Inorganic additives such as fillers, thickeners and thixotropic agents, are used too adjust the viscosity and the flow property of the components to the required viscosity and flow property wherein fumed silica post-treated with polydimethyl siloxane is used as a thickener and thixotropic agent.

A disadvantage of the known composition is that sedimentation of solids occurs within a few days when stored at +40° C.

An object of the invention is, therefore, a thickener and thixotropic agent for hardening containing strongly polar liquid amines, particularly 2-methyl-1,5-pentanediamine, which avoids the drawbacks mentioned above, which is chemically stable particularly in the polar and basic environment of hardening components, prevents sedimentation of solids and thus permits adjustment of the desired flow properties.

In the case of hardener components for flow or injection-enabled systems which contain liquid components, such as amines and/or peroxides, in particular, thickeners and thixotropic agents are required to adjust the desired viscosities and flow properties. These can be contained in a proportion of up to 5% by weight or more in the hardener component. The same applies to the reactive resin component of such systems. However, the used fumed silicas are very expensive, so their use is not economical in mass production.

Another object of the invention is therefore to provide an alternative thickener, which has the advantages of fumed silicas but that is markedly more economical, and which in particular is chemically stable in the (highly) polar and basic environment, which prevents sedimentation of solids and does not adversely affect the desired flow properties, the hardening properties of mortar mixture and the properties of the hardened material.

Surprisingly, the storage stability, the viscosity and flow properties of the hardener component of the composition of the EP 2357162 A1 can be effective only with highly hydrophobic fumed silicas, i.e., be adjusted with fumed silicas with $C_8$-$C_{16}$ alkyl groups on their surface, wherein a fumed silica whose surface has $C_8$-alkyl groups on its surface has been found to be particularly effective.

It was also surprising that the fumed silica with $C_8$-$C_{18}$ alkyl groups on their surface can be partially replaced by cellulose or derivatives thereof without negatively affecting the properties of the hardener component of the mortar mixture. However, the silica can be replaced only insofar as this is required to establish the required viscosity. The flow properties of the component cannot be adjusted with cellulose or derivatives thereof.

A first object of the invention, therefore, is an additive composition comprising a thickening agent and a thixotropic agent, characterized in that the thickening agent is cellulose or a cellulose derivative and the thixotropic agent is a fumed silica whose surface is modified with groups of the general formula (I)

$$-SiR_aR^1{}_bOR^2{}_c \qquad (I),$$

in which a=1, 2 or 3, b=0, 1 or 2 and c=0, 1, or 2, wherein a+b+c=3, and R can be a monovalent, optionally mono- or poly-unsaturated optionally branched hydrocarbon radical having 1 to 24 carbon atoms, $R^1$ can likewise be monovalent, optionally mono- or polyunsaturated, optionally branched hydrocarbon radical having 1 to 20 carbon atoms, with the proviso that at least one of the radicals R or $R^1$ is a hydrocarbon radical with more than 3 carbon atoms, $R^2$ can be a hydrogen atom, likewise a monovalent, optionally mono- or polyunsaturated, optionally branched hydrocarbon radical with 1 to 20 carbon atoms or a bond to another Si atom.

It is preferable that the radicals R are alkyl radicals such as methyl, ethyl, propyl, hexyl, such as n-hexyl or i-hexyl, octyl such as n-octyl or i-octyl, n-dodecyl, n-hexadecyl or octadecyl radicals.

Preferably, the $R^1$ radicals are alkyl radicals such as methyl, ethyl or propyl radicals.

Preferred groups on the silica surface are n-octylsilyldioxy groups ($-SiC_8Hi7(OR^2)_2$), i-octylsilyldioxy groups ($-SiC_8H_{17}(OR^2)_2$), n-octylmethylsilyloxy groups ($-SiC_8H_{17}CH_3OR^2$) and i-octylmethylsilyloxy groups ($-SiC_8H_{17}CH_3OR^2$), among which n-octylsilyldioxy groups ($-SiC_8H_{17}(OR^2)_2$), and i-octylsilyldioxy groups ($-SiC_3H_{17}(OR^2)_2$) are particularly preferred.

The silica surface may be modified exclusively with a group type or simultaneously with various groups. Preferably, the modification is exclusively of one type.

The proportion of surface-modified fumed silica is preferably 25 to 95% by weight, more preferably 30 to 75% by weight, still more preferably 30 to 60% by weight and particularly preferably 35 to 50% by weight based on the pure additive composition.

All modified celluloses are suitable as cellulose derivatives, which are chemically stable under the conditions present in the hardener components and conditions that are capable of positively influencing the settling of solids, without negatively compromising the properties of the mortar mixture. Preference is given to unmodified cellulose and cellulose ethers, such as methyl cellulose, ethyl cellulose, methylhydroxy celluloses, hydroxyethyl cellulose, carboxymethyl cellulose, carboxyethyl cellulose, carboxymethyl cellulose or ethyl derivatives thereof, and benzyl cellulose esters such as derivatives of nitrocellulose, cellulose acetates, cellulose butyrate, cellulose acetobutyrate, cellulose acetopropionate and cellulose propionate; and mixtures thereof. Non-modified cellulose is particularly preferred.

The proportion of the cellulose or the cellulose derivatives is preferably 5 to 75% by weight, more preferably 25 to 70% by weight, even more preferably 40 to 70% by weight, and particularly preferably 50 to 65% by weight, based on the pure additive composition.

As with fumed silica post-treated with octylsilane, thickened as well as non-thickened, correspondingly post-treated silicas are used. The tapped density of the thickened silica is suitable if it is 55 to 200 g/l, but preferably about 60 g/l and 90 g/l. Non-densified silica is preferred. By way of example, AEROSIL® R805, AEROSit® R805 VV60 and AEROSIL® R805 VV90 from Evonik Industries AG, HDK® H20RH from Wacker Chemie AG and CAB-O-SIL® TS382 from Cabot can be mentioned.

The additive composition according to the invention can, in addition to the surface-modified fumed silica, contain additional thixotropic agents, such as, for example, untreated silicas.

With the additive composition of the invention, hardener compositions based liquid hardeners such as amines and/or peroxides can be economically manufactured, which are stable in storage and whose viscosity and flow properties can be specifically adjusted.

The object of the invention is therefore also the use of the additive composition of the invention as an additive for preparing a hardener composition comprising an amine selected from primary and/or secondary aliphatic, cycloaliphatic, aromatic and/or araliphatic amines and/or polyamines, in particular primary and/or secondary polyamines, such as 2-methyl-1,5-pentanediamine, and optionally, namely in the case of a hybrid hardener, a peroxide and the use of the additive composition of the invention to adjust the viscosity of the hardener composition.

The hardener produced by the additive composition of the invention is particularly suitable as a hardener component for a multi-component reaction resin composition based on a binder with a resin component based on amine-hardenable compounds or based on amine-hardenable compounds and radically hardenable compounds (hybrid binder).

Another object of the invention is therefore a hardening component for reaction resin-based compositions with amine-hardenable compounds or based on amines and free-radical-hardenable compounds comprising at least one amine selected from primary or secondary aliphatic amines and primary or secondary aliphatic or araliphatic polyamines, and an additive composition as described above.

The one amine used for hardening the compound, which can react with an amine, is suitably a primary and/or secondary amine. The amine may be aliphatic, cycloaliphatic, aromatic and/or araliphatic, and carry one or more amino groups (hereinafter referred to as a polyamine). The polyamine preferably carries at least two primary aliphatic amino groups. Furthermore, the polyamine can also carry amino groups having a primary secondary or tertiary character. Polyaminoamides and polyalkylene oxide-polyamines or amine adducts, such as amine-epoxy resin adducts or mannich bases are also suitable. Araliphatic amines are defined as those that contain both aromatic and aliphatic radicals.

Suitable amines, without limiting the scope of the invention, are, for example: 1,2-diaminoethane (ethylenediamine) 1,2-propanediamine, 1,3-propanediamine, 1,4-diaminobutane, 2,2-dimethyl-1,3-propandiamine (neopentanediamine), diethylaminopropylamine (DEAPA), 2-methyl-1,5-diaminopentane, 1,3-diaminopentane, 2,2,4- or 2,4,4-trimethyl-1,6-diaminohexane and mixtures thereof (TMD), 1-amino-3-aminomethyl-3,5,5 trimethylcyclohexane, 1,3-bis(aminomethyl) cyclohexane, 1,2-bis(aminomethyl) cyclohexane, hexamethylenediamine (HMD), 1,2- and 1,4-diaminocyclohexane (1,2-DACH and 1,4-DACH), bis(4-aminocyclohexyl) methane, bis(4-amino-3-methylcyclohexyl) methane, diethylenetriamine (DETA), 4-azaheptane-1,7-diamine, 1,11-diamino-3,6,9-trioxundecane, 1,8-diamino-3,6-dioxaoctane, 1,5-diamino-methyl-3-azapentane, 1,10 diamino-4.7-dioxadecane, bis(3-aminopropyl) amine, 1,13-diamino-4,7,10-trioxatridecane, 4-aminomethyl-18-diaminooctane, 2-butyl-2-ethyl-1,5-diaminopentane, N,N-bis-(3-aminopropyl) methylamine, triethylenetetramine (TETA), tetraethylenepentamine (TEPA), pentaethylenehexamine (PEHA), bis(4-amino-3-methylcyclohexyl) methane, 1,3-benzoidimethanamine (m-xylylendiamine, mXDA), 1,4-benzoidimethanamine (p-xylxylendiamine, pXDA), 5-(aminomethyl) bicyclo [[2.2.1]hept-2-yl] methylamine (NBDA, norbomandiamine) dimethyldipropylenetriamine, dimethylaminopropyl aminopropylamine (DMAPAPA), 3-aminomethyl-3,5,5-trimethylcyclohexylamine (isophoronediamine (IPD)), diaminodicyclohexyimethane (PACM), mixed polycyclic amines (MPCA) (e.g. Ancamine© 2168), dimethyldiaminodicyclohexylmethane (Laromin® C260), 2,2-Bis(4-aminocyclohexyl) propane, (3(4),8(9)bis(aminomethyl) dicyclo [5.2.1.0$^{2,6}$]decane (isomer mix, tricyclic primary amines; TCD diamine).

Preferred are polyamines such as 2-methylpentanediamine (DYTEK A®) (1-amino-3-aminomethyl-3,5,5-trimethylcyclohexane (IPD), 1,3-benzoidimethanamine (m-Xylylendiamin, mXDA), 1,4-benzoidimethanamine (p-xylylenediamine, pXDA), 1,6-diamino-2,2,4-trimethylhexane (TMD), diethylenetriamine (DETA), triethylenetetramine (TETA), tetraethylenepentamine (TEPA), pentaethyienhexamine (PEHA), N-ethylaminopiperazine (N-EAP), 1,3-bisaminomethylcyclohexane (1,3-BAC) (3(4),8(9)bis(aminomethyl) dicyclo[5.2.1.0$^{2,6}$] decane (mixture of isomers, tricyclic primary amines; TCD-diamine), 1,14-diamino-4,11-dioxatetradecane, dipropylenetriamine, 2-methyl-1,5-pentanediamine, N,N'-dicyclohexyl-1,6-hexanediamine, N,N'-dimethyl-1,3-diaminopropane, N,N'-diethyl-1,3-diaminopropane, N,N-dimethyl-1,3-diaminopropane, secondary polyoxypropylene di- and triamines, 2,5-diamino-2,5-dimethylhexane, bis(amino-methyl) tricyclopentadienes, 1,8-diamino-p-menthane, bis(4-amino-3,5-di methylcyclohexyl) methane, 1,3-bis(aminomethyl) cyclohexane (1,3-BAC), dipentylamine, N-2-(aminoethyl) piperazine (N-AEP), N-3-(aminopropyl) piperazine, piperazine.

The amine may be used either alone or as a mixture of two or more thereof, wherein a mixture of two or more thereof is preferred.

The suitable initiator usable for the hardening of the radically hardenable compound is a peroxide. All peroxides known to the person skilled in the art are used for the hardening of unsaturated polyester resins and vinyl ester resins can be used. Such peroxides include organic and inorganic peroxides, either liquid or solid, wherein hydrogen peroxide can also be used. Examples of suitable peroxides are peroxy carbonates (of the formula —OC(O)O—), peroxyesters (of the formula —C(O)OO), diacyl peroxides (of the formula —O(O)OOO(OO)—), dialkyl peroxides (of the formula —OO) and the like. These may be present as an oligomer or polymer. An extensive series of examples of suitable peroxides is described in the application US 2002/0091214-A1, paragraph [0018].

Preferably, the peroxides are selected from the group of organic peroxides. Suitable organic peroxides are: tertiary alkyl hydroperoxides, such as tert-sutylhydroperoxide, and other hydroperoxides such as cumene hydroperoxide, peroxyesters or peracids, such as tert-butyl peresters, benzoyl peroxide, peracetates and perbenzoates, lauryl peroxide, including (di)peroxyesters, perethers, such as peroxydiethylether, perketones, such as methylethyl ketone peroxide. The organic peroxides used as hardeners are often tertiary peresters or tertiary hydroperoxides, i.e., peroxide compounds with tertiary carbon atoms that are bound directly to a —OO-acyl or —OOH group. However, mixtures of these peroxides with other peroxides may be used according to the invention. The peroxides may also be mixed peroxides, that is, peroxides having two different peroxygen-bearing units in one molecule. Preferably, benzoyl peroxide (BPO) is used for hardening.

In this connection, reference is made to the application EP 1 674 495 A1, which is incorporated herein by reference.

The hardener component may also contain an inorganic filler. The fillers used are customary fillers, preferably mineral or mineral-like fillers such as quartz, glass, sand, silica sand, silica powder, porcelain, corundum, ceramic, talc, silica (e.g. fumed silica), silicates, clay, titanium dioxide, chalk, barite, feldspar, basalt, aluminum, granite or sandstone, polymeric fillers, such as thermosetting plastics, hydraulically hardenable fillers, such as gypsum, lime or cement (e.g. tonered or Portland cement), metals such as aluminum, carbon black, as well as timber, mineral or organic fibers, or the like, or mixtures of two or more thereof, which may be added as a powder, in granular form or in the form of moldings. The fillers can be present in any form, for example as a powder or flour, or as moldings, e.g. in cylindrical, ring, spherical, flake, rod, saddle or crystal form, or also in fiber form (fibrillar fillers), and the corresponding base particles preferably have a maximum diameter of 10 mm. However, preferable, and with a clearer reinforcing effect, are the globular, inert materials (spherical shape).

The inventive additive composition and the hardener composition can be easily prepared by known methods.

EMBODIMENTS

To illustrate the invention, the following hardener components, and as a comparison the hardener components of the reaction resin composition according to EP 2357162 A1, are prepared, and their flow properties, once immediately after production and again after storage at +40° C. are examined over two days and over one week.

Example 1

38.9 g of 2-Methyl-1,5-pentanediamine, 6.5 g tert-butyl perbenzoate, 45.5 g of silica powder and 9.1 g of a fumed silica post-treated with octylsilane (Aerosil®R 805 from Evonik Industries AG or HDK® H20RH from Wacker Chemie AG) are homogenized in the Speedmixer to a pasty mass.

Example 2

38.9 g 2-Methyl-1,5-pentanediamine, 6.5 g tert-butyl perbenzoate, 45.35 g of silica powder, 2.6 g of fumed silica post-treated with octylsilane (Aerosil® R805 from Evonik Industries AG or HDK® H20RH Wacker Chemie AG) and 5.4 g cellulose (JELUCEL® HM 30, JELU plant of J. Ehrler GmbH & Co. KG) are homogenized in the Speedmixer to a pasty mass.

Comparative Example 1

As a comparison, analogously to Example 1, a pasty mass is produced, with the difference that instead of 9.1 g of the fumed silica post-treated with octylsilane, 5.7 g of polydimethylsiloxane (Aerosil® R202, Evonik Industries AG) is used, in accordance with the composition of the hardener component of EP 2357182 A1 from Examples 1 and 2.

Determination of Rheological Behavior of the Compositions (Time Dependence, Thixotropy)

For the determination of the rheological behavior of the compositions prepared in Examples 1 and 2 and in Comparative Example 1, the freshly prepared materials as well as the mixtures were examined once after storage for 2 days, after one week and after three months. For this, the masses were each placed in a 150 ml PE beaker and stirred vigorously with a wooden tongue depressor spatula for 10 seconds. Afterward, the spatula was quickly pulled out from the sample and held horizontally. It was observed to what extent the sample runs down from the spatula. For all samples, the consistency was pasty/solid before stirring.

The results are shown in Table 1.

TABLE 1

Results of the determination of the rheological properties

| Example | Observation | Thixotropy |
|---|---|---|
| Comparative Example 1; freshly prepared | after stirring pasty/solid again; does not flow from the spatula | —[a] |
| Example 1; freshly prepared | after stirring pasty/solid again; does not flow from the spatula | — |
| Example 2; freshly prepared | after stirring again pasty/solid again; does not flow from the spatula | — |
| Comparative Example 1; storage 2 days + 40° C. | after stirring, the sample flows from the spatula | ++[b] |
| Example 1; storage 2 days, +40° C. | after stirring pasty/solid again; does not flow from the spatula | — |
| Example 2; Storage 2 days, +40° C. | after stirring pasty/solid again; does not flow from the spatula | — |
| Comparative Example Storage 1 week, +40° C. | after stirring the sample flows from the spatula | ++[b] |
| Example 1; storage 1 week, +40° C. | after stirring pasty/solid again; does not flow from the spatula | — |
| Example 2; storage 1 week, +40° C. | after stirring pasty/solid again; does not flow from the spatula | — |
| Comparative Example 1; storage 3 months + 40° C. | after stirring, the sample flows from the spatula | ++[b] |
| Example 1; storage, 3 months, +40° C. | after stirring pasty/solid again; does not flow from the spatula | — |
| Example 2; storage, 3 months, +40° C. | after stirring pasty/solid again; does not flow from the spatula | — |

[a]"—" no thixotropy
[b]"++": Strong thixotropy, pasty mass is again only pasty/solid after a period of one day or longer The results clearly show that composition of Comparative Example 1 after only two days of storage at +40° C. exhibits strong thixotropic behavior, that is, the mass remains liquid immediately after completion of shearing, whereas the masses according to Examples 2 and 3 exhibit no thixotropic behavior even after storage for one week at +40°, that is, become pasty/solid again immediately after completion of the shearing. Even after storage for three months at +40 C, the mixture according to Example 3 displayed no thixotropic behavior, i.e., after completion of the shearing it became directly pasty/solid again. From this, the advantageous influence of the composition of the additive according to the invention becomes clear.

The invention claimed is:

1. A hardener component for reactive resin compositions based on a binder with a resin component based on amine-hardenable compounds or on the basis of amine-hardenable compounds and radically hardenable compounds comprising at least one amine and an additive composition comprising a thickening agent and a thixotropic agent,
   wherein the thickening agent is a cellulose or a derivative thereof, and
   wherein the thixotropic agent is a fumed silica whose surface is modified with groups of the general formula (I):

~$SiR_aR^1{}_bOR^2{}_c$     (I), wherein
   a=1, 2 or 3;
   b=0, 1 or 2;
   c=0, 1 or 2; and
   a+b+c=3, and
   wherein R is a monovalent hydrocarbon radical having 1 to 24 carbon atoms that is optionally mono- or polyunsaturated and optionally branched;
   $R^1$ is a monovalent hydrocarbon radical having 1 to 20 carbon atoms that is optionally mono- or polyunsaturated and optionally branched,
   with the proviso that at least one of R or $R^1$ is a monovalent hydrocarbon radical having more than 3 carbon atoms; and
   $R^2$ is a hydrogen atom; a bond to another Si atom; or a monovalent hydrocarbon radical having 1 to 20 carbon atoms that is optionally mono- or polyunsaturated and optionally branched.

2. The hardener component according to claim 1, wherein at least one amine is selected from primary and/or secondary aliphatic, cycloaliphatic, aromatic and/or araliphatic amines and/or polyamines.

3. The hardener component according to claim 2, wherein at least one amine is 2-Methyl 1,5-pentanediamine.

4. The hardener component according to claim 1, wherein it further includes a radical initiator for a radically hardenable compound.

5. The hardener component according to claim 4, wherein the radical initiator is a peroxide compound.

6. The hardener component according to claim 4, wherein the peroxide is tert-butylperoxy benzoate.

7. The hardener component according to claim 1, wherein it further contains at least one inorganic filler selected from the group consisting of mineral or mineral-like fillers.

8. The hardener component according to claim 7, wherein the inorganic filler is selected from the group consisting of quartz, glass, sand, silica sand, silica powder, porcelain, corundum, ceramics, talc, silicates, clay, titanium dioxide, chalk, barite, feldspar, basalt, aluminum, granite or sandstone, polymeric fillers, hydraulically hardenable fillers, metals, mineral or organic fibers, or mixtures of two or more thereof.

\* \* \* \* \*